Figure 1:
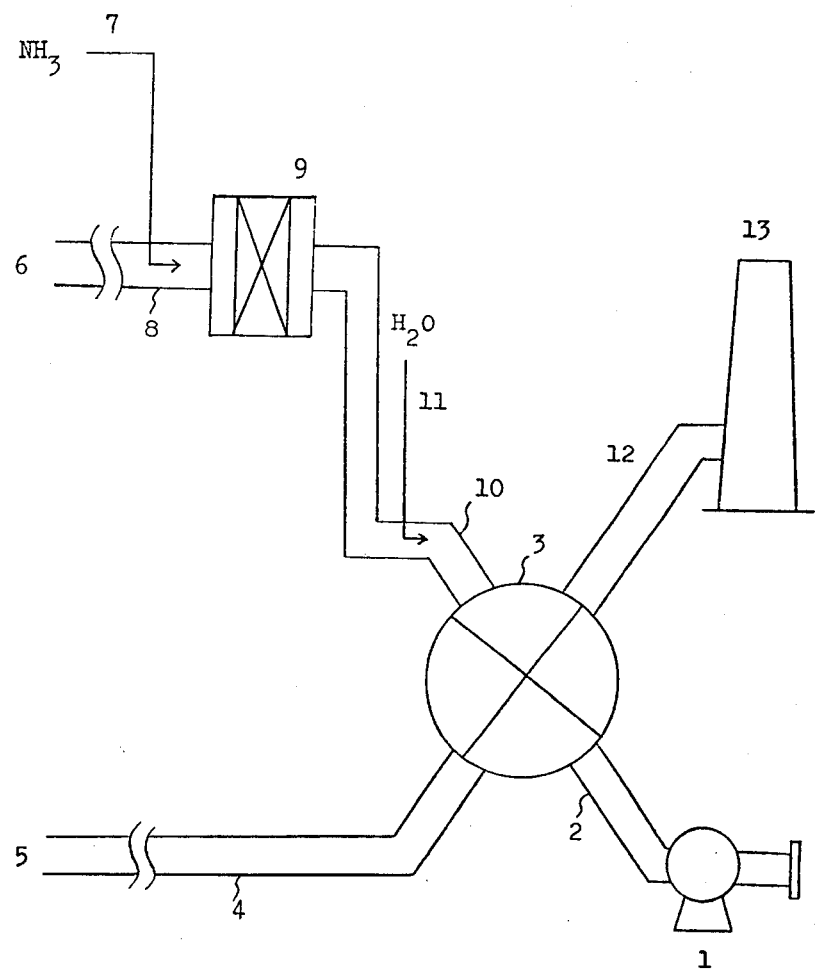

United States Patent [19]

Shiga et al.

[11] 4,051,225
[45] Sept. 27, 1977

[54] METHOD FOR THE HEAT RECOVERY IN THE PROCESSES OF THE REMOVAL OF NITROGEN OXIDES FROM EXHAUST GASES

[75] Inventors: Shujiro Shiga, Chiba; Takeshi Katsumata, Ichihara; Yasushi Okamoto, Ichihara; Tadashi Hikasa, Ichihara, all of Japan

[73] Assignee: Sumitomo Chemical Company, Limited, Osaka, Japan

[21] Appl. No.: 641,536

[22] Filed: Dec. 17, 1975

[30] Foreign Application Priority Data

Dec. 18, 1974 Japan .............................. 49-145901
July 17, 1975 Japan .............................. 50-87963

[51] Int. Cl.² ...................... C01B 21/00; C01B 17/00
[52] U.S. Cl. ................... 423/235; 423/242; 423/545; 110/1 J
[58] Field of Search ............ 423/545, 242, 235, 237; 110/1 K, 1 J

[56] References Cited

U.S. PATENT DOCUMENTS

| 3,508,868 | 4/1970 | Kiyoura | 423/545 |
| 3,864,451 | 2/1975 | Lee et al. | 423/239 |
| 3,900,554 | 8/1975 | Lyon | 423/235 |
| 3,914,390 | 10/1975 | Kudo et al. | 423/239 |
| 3,928,536 | 12/1975 | Lewis | 423/242 |
| 3,929,967 | 12/1975 | Cann | 423/242 |

FOREIGN PATENT DOCUMENTS

| 577,486 | 5/1957 | Canada | 110/1 K |
| 895,484 | 5/1962 | United Kingdom | 110/1 J |
| 878,722 | 10/1961 | United Kingdom | 110/1 J |
| 878,723 | 10/1961 | United Kingdom | 110/1 J |

Primary Examiner—O. R. Vertiz
Assistant Examiner—Eugene T. Wheelock
Attorney, Agent, or Firm—Birch, Stewart, Kolasch and Birch

[57] ABSTRACT

A method for heat recovery in the processes of the removal of nitrogen oxides from exhaust gases containing sulfur oxides and nitrogen oxides by a catalytic or non-catalytic reduction thereof with ammonia. After passing through the reaction zone for the reduction of nitrogen oxides the down flow gases are subjected to the submitted air in a heat exchanger. The process is characterized in that the molar ratio of ammonia to sulfuric anhydride and the concentration of steam in the gases at the inlet of the heat exchanger is controlled in the range of $0 < NH_3/SO_3 < 2$, preferably $0 < NH_3/SO_3 < 1.5$ and more than 12% by volume, preferably more than 15% by volume, respectively, and thereby the process can continuously proceed without the production of ammonium sulfate and the deposition or adhesion thereof onto the surface of the various devices in the apparatus therefor.

4 Claims, 2 Drawing Figures

METHOD FOR THE HEAT RECOVERY IN THE PROCESSES OF THE REMOVAL OF NITROGEN OXIDES FROM EXHAUST GASES

The present invention relates to a method for heat recovery in processes concerned with the removal of nitrogen oxides by a reduction thereof with ammonia. More particularly, it relates to an improved method for the recovery of the waste heat in processes of the removal of nitrogen oxides by a reduction thereof with ammonia without any deposition and adhesion of ammonium salts of sulfuric acid on the heat exchanger. The latter is provided at the down flow of the gases after they pass through the reaction zone for the reduction of the nitrogen oxides to harmless nitrogen gases.

For the purpose of the heat recovery from exhaust gases of a boiler or a heating furnace, there has widely been used a technique of a heat exchange between exhaust gases of combustion and air supplied for the combustion of fuels by a heat exchanger (hereinafter, referred to as "air preheater"). However, since the recent energy crisis, it has been desired in the art to find a more effective method for the heat recovery.

In the case of heat recovery from exhaust gases of combustion, it is necessary to lower the temperature for the operation of the air preheater as low as possible so as to increase the recovery efficiency. However, when a heavy oil containing 1 to 4% by weight of sulfur components is burnt, the gas exhausted therefrom contains about 20 to 100 ppm of sulfuric anhydride ($SO_3$) and the sulfuric anhydride is reacted with the moisture contained in the gas to give sulfuric acid ($H_2SO_4$). Accordingly, when the temperature of the air preheater is lowered below the dew point of sulfuric acid, the sulfuric acid thus produced condenses on the surface of the metallic materials for heat transfer used in the air preheater, which induces the remarkable corrosion of the metal surface.

For operating the air preheater at a lower temperature without such a corrosion of metallic materials for heat transfer with sulfuric acid, it is proposed to shift the dew point of sulfuric acid toward a lower temperature. This is accomplished by decreasing the concentration of the contained sulfuric acid by means of blowing a large excess amount of ammonia ($NH_3$) into the exhaust gases containing sulfuric anhydride. This produces an ammonium salt of sulfuric acid, thereby decreasing the concentration of sulfuric anhydride contained therein and thus inhibiting the production of a large amount of sulfuric acid.

According to this known method, the corrosion of the metallic materials for heat transfer with sulfuric acid is prevented by lowering the dew point of sulfuric acid, wherein the produced ammonium salt of sulfuric acid must be ammonium sulfate [$(NH_4)_2SO_4$]. Various studies have been done in order to determine the suitable concentration of ammonia to be blown into the exhaust gases and the suitable temperature at the blowing of ammonia for producing ammonium sulfate. The corrosion of the metallic materials for heat transfer has been effectively inhibited by carrying out the above method under the suitable conditions. For instance, The Bulletin of The Petroleum Society of Japan, Vol. 5, pages 93 to 100 describes the test results of the blowing of ammonia into a gas exhausted from No. 4 Boiler of Tokyo Denryoku K.K., Tsurumi Power Station, in which test ammonia of 0.06 to 0.10% by weight on the basis of the combustion amount of a heavy oil was blown into the gas prior to the air preheater and thereby ammonium sulfate was produced. In this test, the degree of the corrosion (shown by the corrosion probe) was decreased from 0.5 mm/year (in case of blowing no ammonia) to 0.1 mm/year.

However, the known method has still some defects. Due to the high melting point of the ammonium sulfate produced, the solid ammonium sulfate is deposited everywhere in the system and is occasionally adhered on the surface of the metallic materials for heat transfer used in the air preheater which causes a marked decrease of the heat transfer coefficient, and further, the deposition of ammonium sulfate induces the closing of the passageway for the gases which causes the increase of the pressure drop and makes impossible the continuous operation of the apparatus.

Moreover, the recent large scale of boilers sometimes exhaust a large volume of waste gases such as 300,000 $Nm^3$/hour or more, and such a large volume of exhaust gases contains a large amount of ammonium sulfate even if the concentration thereof is low, and as a result, the amount of dusts in the gases exhausted from a stack is remarkedly increased. Accordingly, it is undesirable from the viewpoint of air pollution. This problem may be solved by providing a dust precipitator on the system, but because of the large volume of exhaust gases and the low concentration of waste components the dust precipitator should have a high efficiency which results in a high cost.

Besides, since the occurrence of photochemical smog in Tokyo in 1970, there is a strong tendency to remove nitrogen oxides from exhaust gases which are deemed to be one of the photochemical smog-inducing substances. Various techniques for the removal of nitrogen oxides from exhaust gases have been studied.

Among the techniques for the removal of nitrogen oxides, that give the most attention is a process of the catalytic reduction with ammonia wherein the nitrogen oxides are reduced to harmless nitrogen gas and water with ammonia in the presence of a catalyst of a non-noble metal oxide carried on a carrier (e.g. alumina carrier) and a process of the non-catalytic reduction with ammonia wherein the nitrogen oxides are reduced to harmless nitrogen gas and water with ammonia in the absence of a catalyst.

These processes proceed as shown in the following reaction schemes:

$$6NO + 4NH_3 \rightarrow 5N_2 + 6H_2O \quad (1)$$

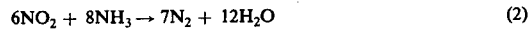
$$6NO_2 + 8NH_3 \rightarrow 7N_2 + 12H_2O \quad (2)$$

It is said that the nitrogen oxides contained in the gases exhausted from a boiler or a heating furnace comprise 90 to 95% by volume of nitrogen monoxide (NO). When the reaction of the above reaction scheme (1) proceeds stoichiometrically, the molar ratio of ammonia to nitrogen monoxide ($NH_3$/NO) is about 0.67. In practice, however, ammonia is usually blown in in an amount of more than the stoichiometric molar ratio of $NH_3$/NO in order to achieve the most efficient results from the above reactions (1) and (2).

The catalytic reduction of nitrogen oxides with ammonia is usually carried out at a temperature of 250° to 400° C which may vary with the kinds of the catalysts and the other reaction conditions. Besides, the non-catalytic reduction of nitrogen oxides with ammonia is carried out at a higher temperature than the temperature for the catalytic reduction of nitrogen oxides which may vary with the other reaction conditions, for instance, by adding an aqueous solution of ammonia or an ammonium salt (e.g. ammonium formate, ammonium oxalate or ammonium carbonate) at a temperature of 870° to 1093° C in the presence of oxygen, or by adding an aqueous solution of ammonia or ammonium salt (e.g. ammonium formate, ammonium oxalate or ammonium carbonate) at a temperature of 706° to 1093° C in the presence of an excess amount of oxygen to which a reductive substance (e.g. hydrogen, carbon monoxide or hydrocarbons) is added (cf. Japanese Patent Laid Open No. 7774/1975). Accordingly, the temperature for the reduction of nitrogen oxides ranges from 200° to 1100° C and the waste heat is recovered by an air preheater provided at the down flow of the gases after they pass through the reaction zone for the reduction of nitrogen oxides to harmless nitrogen gases in these processes. When the exhaust gases to be treated contain sulfuric anhydride, the processes have drawbacks in that the air preheater for the heat recovery is corroded with sulfuric acid.

This deficiency is one of the essential problems in the processes for the removal of nitrogen oxides by the reduction thereof with ammonia, and at the same time, the ammonium salts of sulfuric acid adhere onto the air preheater etc., which induces the increase of the pressure drop, and as the result, the whole process must be stopped. It is proposed to prevent such a corrosion with sulfuric acid by adding an excess amount of ammonia to the exhaust gases to be treated. However, when a Ljungstrom air preheater is used, a part of the down of flow gases passed through the reaction zone for the reduction of nitrogen oxides leaks to the inlet of said reaction zone and then the ammonium salts of sulfuric acid accompanied with the leaked gas are introduced into the reaction zone for the reduction of nitrogen oxides, whereby the ammonium salts of sulfuric acid, particularly the thermally stable ammonium sulfate, give undesirably physical and chemical influence on the reaction of the removal of nitrogen oxides.

Under these circumstances, the present inventors have done extensive studies to find an improved method for the heat recovery in the processes of the removal of nitrogen oxides by the reduction thereof with ammonia without such defects as in the known methods. The present inventors have noticed the facts that when the ammonium salt of sulfuric acid produced in the course of the processes is ammonium sulfate [$(NH_4)_2SO_4$], it induces such a defect as mentioned above, but ammonium hydrogen sulfate [$NH_4HSO_4$] has an extremely high deliquescence and a far lower melting point than that of ammonium sulfate and can be easily removed from the system as a molten product without adhering onto the air preheater etc. On the basis of these facts, the present inventors have found that the waste heat can efficiently be recovered in the processes of the removal of nitrogen oxides from the exhaust gases of combustion by the catalytic or non-catalytic reduction thereof with ammonia without the deposition or adhesion of ammonium salts of sulfuric acid onto the air preheater etc. by controlling each the molar ratio of ammonia to sulfuric anhydride and the concentration of steam in the gases at the inlet of the air preheater within a specific range, thereby producing ammonium hydrogen sulfate (not ammonium sulfate) from sulfuric anhydride which can be removed from the system of the processes.

Therefore, it is an object of the present invention to provide an improved method for the heat recovery in processes of the removal of nitrogen oxides from exhaust gases by a catalytic or non-catalytic reduction thereof with ammonia.

Another object of the invention is to provide a method for recovering continuously the waste heat in processes of the removal of nitrogen oxides from exhaust gases containing sulfuric anhydride.

A further object of the invention is to provide an improved process for the removal of nitrogen oxides from exhaust gases of combustion containing sulfur oxides and nitrogen oxides by a catalytic or non-catalytic reduction thereof with ammonia, while achieving efficient heat recovery.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The method for the heat recovery of the present invention can effectively be carried out by controlling the molar ratio of ammonia to sulfuric anhydride and the concentration of steam in the gases at the inlet of the air preheater to $0<NH_3/SO_3<2$ and more than 12% by volume respectively, in the processes of the removal of nitrogen oxides by the catalytic or non-catalytic reduction thereof with ammonia.

According to the present invention, the process of the catalytic reduction of nitrogen oxides with ammonia is continuously workable until the catalyst used therein loses the catalytic activity thereof. The process of the non-catalytic reduction of nitrogen oxides with ammonia is also continuously workable. These excellent effects can be achieved by controlling the molar ratio of ammonia to sulfuric anhydride in the waste gases at the inlet of the air preheater to the specific range so that the ammonium salt of sulfuric acid produced at the down flow of the gases after the air preheater is in the form of ammonium hydrogen sulfate and further by increasing the concentration of steam in the gases so that the resulting ammonium hydrogen sulfate can be easily removed off from the reaction system in the molten state by utilizing the freezing point depression effect and the high deliquescence thereof. As a result the air preheater can be operated so as to achieve efficiently the desired heat recovery.

Thus, in the present invention, the molar ratio of ammonia to sulfuric anhydride in the down flow gases after the reaction zone for the reduction of nitrogen oxides, i.e. at the inlet of the air preheater, is controlled within the range of $0<NH_3/SO_3<2$, preferably $0<NH_3/SO_3<1.5$, by which the ammonium salt of sulfuric acid is therein produced predominantly in the form of ammonium hydrogen sulfate (but not ammonium sulfate). Besides, the concentration of steam in the gases at the inlet of the air preheater is increased more than the concentration thereof in the usual boiler exhaust gases (e.g. 10 to 12% by volume), i.e. more than 12% by volume, preferably more than 15% by volume, by which the freezing point depression and the deliquescence of ammonium hydrogen sulfate are promoted.

The heat recovery according to the present invention can be efficiently and continuously carried out by subjecting the down flow gases, after they are passed through the reaction zone for the reduction of nitrogen oxides, to a heat exchange with the submitted air in an air preheater. The heat is recovered from the exhaust gases at elevated temperatures and the preheated air is sent to and used in another device such as a boiler. The molar ratio of ammonia to sulfur anhydride and the concentration of steam in the down flow gases in the specific ranges mentioned above, thereby preventing the production of ammonium sulfate and the deposition or adhesion thereof onto the surface of metallic materials for heat transfer in the air preheater, the catalyst for the reduction of nitrogen oxides, the ducts, etc. in the apparatus. The process can thus continuously proceed without the necessity of stopping the apparatus for repairs as in the conventional methods.

For increasing the concentration of steam in the gases, it is necessary to inhibit the variation of the concentration of steam within the air preheater, irrespective of the type of air preheater such as a shell and tube type air preheater or a Ljungstrom air preheater. From this standpoint, it will be understood that the present method is essentially different from the conventional method wherein steam or air is jetted by a soot-blow provided on the air preheater and whereby the scales on the surface of metallic materials for heat transfer are removed. That is, according to the soot-blow, steam or air is intermittently jetted and the scales are removed by the jetting flow, and therefore, this method is essentially different from the method of the present invention wherein the concentration of steam in the air preheater is always maintained at a fixed level even in case of blowing steam by jetting. For this purpose, the increase of the concentration of steam should be done at the upper flow of the gases before the air preheater. Thus, the increase of the concentration of steam can be effected, for instance, by providing a water quencher or by jetting steam into the gas flow from a jetting nozzle of steam. When a wet process for the removal of sulfur oxide is provided at the upper flow of gases before the process of the removal of nitrogen oxides, the exhaust gases occasionally have a sufficiently high concentration of steam, even if any additional steam is not added thereto.

As is explained above, according to the present invention, the air preheater used in the processes of the removal of the nitrogen oxides by a reduction thereof with ammonia can be operated at a lower temperature by controlling the molar ratio of ammonia to sulfuric anhydride and the concentration of steam in the gases at the inlet of the air preheater so that the ammonium salt of sulfuric acid is produced in the form of ammonium hydrogen sulfate which is easily removed from the system, and thereby the heat recovery can be efficiently achieved.

In addition to the lowering of the lower limit of the operable temperature of the air preheater, the present invention shows an excellent effect on the reduction reaction of nitrogen oxides. That is, according to the present invention, there can be prevented the undesirable decreasing of the reaction for reducing nitrogen oxides due to the produced ammonium sulfate as observed in the conventional processes. For instance, when a large volume of gases is treated, a Ljungstrom air preheater is usually used as the air preheater from the standpoint of the cost per volume of the gases to be treated. In this type of air preheater, a part of the down flow gases to be subjected to the heat recovery reaches the reaction zone for the reduction of nitrogen oxides together with the exhaust gases of combustion, and in this case, if the ammonium salt of sulfuric acid produced in the air preheater is ammonium sulfate, it is carried to the reaction zone for the reduction of nitrogen oxides in the powdery form and is deposited and adhered onto the surface of the reduction catalyst which causes the lowering of the reaction for reducing nitrogen oxides. In the case of the non-catalytic reduction of nitrogen oxides, the powdery ammonium sulfate is deposited and adhered onto the surface of the ducts in the reaction zone for the reduction of nitrogen oxides and causes the lowering of the reaction, too. According to the present invention, such defects as mentioned above can be prevented and the reaction for reducing nitrogen oxides can be smoothly and continuously carried out without any trouble as in the conventional processes.

The present invention is illustrated by the following Examples, referring to the accompanying drawings, but is not limited thereto.

EXAMPLE 1

The heat recovery is carried out by using an apparatus as shown in FIG. 1.

FIG. 1 shows an apparatus for the heat recovery from the down flow gas, after the reaction zone, in the processes of the removal of nitrogen oxides from the combustion gases exhausted from an established boiler plant by a catalytic or non-catalytic reduction thereof with ammonia.

To the combustion gas carried from a boiler through the duct 6 is added ammonia from the feed nozzle 7 at the duct 8 and the mixture is subjected to the reaction for reducing nitrogen oxides to harmless nitrogen gases at the reaction zone for the nitrogen oxides removal 9. The combustion gas thus treated is subjected to a heat exchange with air submitted by the air blower 1 at the air preheater 3 and is then discharged from the stack 13. The preheated air is sent to the boiler through the duct 5.

At the reaction zone for the nitrogen oxides removal 9, there is set a reactor charged with a catalyst for the reduction of nitrogen oxides with ammonia in case of the process for the removal of nitrogen oxides by a catalytic reduction with ammonia. It is not needed in the case of the process for the removal of nitrogen oxides by a non-catalytic reduction.

The down flow gas at the position 10 after the reaction zone 9 has a temperature of 310° C, a concentration of sulfuric anhydride of 26 ppm and a concentration of ammonia of 25 ppm. The concentration of steam in the gas (10.7% by volume) is increased till 16% by volume by jetting steam thereto from the steam-jetting nozzle 11.

The air preheater 3 is a shell and tube type air preheater, and the temperatures of the gas and air at the inlet or outlet of the air preheater 3 are as follows: the temperature of the air at the inlet of the air preheater (at the position 2): 20° C, that of the air at the outlet thereof (at the position 4): 180° C, that of the gas at the inlet thereof (at the position 10): 310° C and that of the gas at the outlet thereof (at the position 12): 201° C.

The apparatus is continuously operated at a flow rate of gas to be treated of 30,000 Nm$^3$/hour for 2,000 hours. The total heat transfer coefficient is not changed between the initiation of the operation and at the time immediately before the operation is stopped, i.e. it is 14 kcal/m$^2$.° C.hour at both times. Besides, the pressure drop (14 mmAq) between at the inlet 10 and at the outlet 12 of the air preheater is not changed, either.

After the operation of the apparatus is stopped, the air preheater is checked, but there is almost never observed the deposition or adhesion of materials therein. Besides, the molten product is intermittently drawn from the bottom of the air preheater (at the side of the gas flow) during the operation and is subjected to X-ray diffraction, and as a result, the molten product consists of predominantly ammonium hydrogen sulfate and contains a slight amount of ammonium ferrous sulfate [FeSO$_4$(NH$_4$)$_2$SO$_4$.6H$_2$O] and ammonium ferric sulfate [Fe$_2$(SO$_4$)$_3$.(NH$_4$)$_2$SO$_4$.24H$_2$O] but does not contain any ammonium sulfate.

The concentration of ammonia, sulfuric anhydride and steam is measured by the methods defined in the provisions of JIS K-0099, JIS K-0103 and JIS Z-8808, respectively.

EXAMPLE 2

Figure 2:
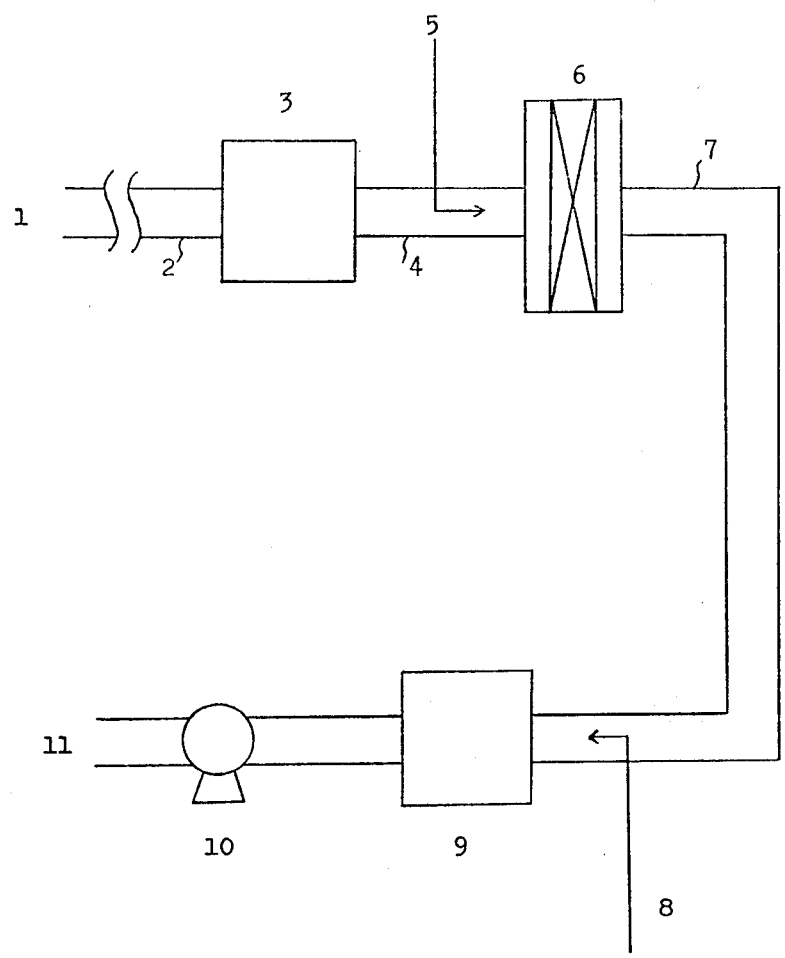

The heat recovery is carried out by using an apparatus as shown in FIG. 2.

FIG. 2 shows an apparatus for the heat recovery from the flow gas in the processes of the removal of nitrogen oxides from the combustion gases exhausted from a boiler by a catalytic or non-catalytic reduction thereof with ammonia. The combustion gases containing sulfur oxides and nitrogen oxides are subjected to the removal of sulfur oxides by an established liquid purifier (i.e. an apparatus for the removal of sulfur oxides by a wet process) (absorbent: sodium sulfite which is repeatedly used after regenerated) and a part of the gases thus treated is introduced to the apparatus.

The gas 1 introduced from the liquid purifier, which contains saturated moisture of about 15.5% by volume at 55° C, is introduced into the electric heating furnace 3 through the duct 2 and therein it is heated to 350° C. After adding thereto ammonia from the feed nozzle 5 at the duct 4, the gas is subjected to the reduction of nitrogen oxides with ammonia at the reaction zone for the nitrogen oxide removal 6. The gas at the position 7 has a temperature of 350° C, moisture of about 15.5% by volume, a concentration of sulfuric anhydride of 15 ppm and a concentration of ammonia of 12 ppm.

At the reaction zone for the nitrogen oxides removal 6, there is set a reactor charged with a catalyst for the reduction of nitrogen oxides with ammonia in case of the process for the removal of nitrogen oxides by a catalytic reduction with ammonia. It is not needed in the case of the process for the removal of nitrogen oxides by a non-catalytic reduction.

After increasing the moisture of the gas up to 18% by volume by jetting therein steam from the steam-jetting nozzle 8, the gas is introduced to the air preheater 9, wherein the temperature of the gas at the outlet of the air preheater is adjusted to the suitable one, and then the materials produced therein are checked. The apparatus is continuously operated for 1,000 hours while controlling the temperature of the gas at the outlet of the air preheater to 110° C. The gas thus treated is discharged from the discharge port 11 via the suction blower 10.

After the operation of the apparatus is stopped, the air preheater 9 is checked, and there is observed no deposition or adhesion of materials on the wall thereof. Besides, the molten product is intermittently drawn from the air preheater during the operation and is subjected to X-ray diffraction as in Example 1, and as the result, the molten product consists of predominantly ammonium hydrogen sulfate. The analysis of various components is carried out by the same methods as described in Example 1.

REFERENCE EXAMPLE

The same apparatus as in Example 1 is continuously operated for 500 hours for the gas having the same concentration of sulfur anhydride and ammonia and at the same temperature as in Example 1 excepting that the concentration of steam (10.7% by volume) in the down flow gas after it has passed through the reaction zone for the reduction of nitrogen oxides is not increased. After operated for 500 hours, the pressure drop at the air preheater increases to 55 mmAq and the total heat transfer coefficient decreases to 6 kcal/m$^2$.° C.hour.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a method for heat recovery during processes for the removal of nitrogen oxides from combustion gases containing sulfur oxides and nitrogen oxides by a catalytic or non-catalytic reduction thereof with ammonia wherein the exhaust gases are introduced into a heat exchanger supplied with air wherein the improvement comprises maintaining at the entrance to said heat exchanger the molar ratio of ammonia to sulfuric anhydride sufficient to form ammonium hydrogen sulfate and in the range of about $0 < NH_3/SO_3 < 2$ and a steam concentration of more than 12% by volume, and removing the ammonium hydrogen sulfate in the molten state from the heat exchanger.

2. The method for the heat recovery according to claim 1, wherein the molar ratio of ammonia to sulfuric anhydride in the combustion gases at the inlet of the heat exchanger is controlled in the range of $0 < NH_3/SO_3 < 1.5$.

3. The method for the heat recovery according to claim 1, wherein the concentration of steam in the combustion gases at the inlet of the heat exchanger is controlled to more than 15% by volume.

4. The method for the heat recovery according to claim 1, wherein the control of the concentration of steam in the combustion gases is carried out by blowing steam into the flow of the gases before the heat exchanger.

* * * * *